No. 792,447. PATENTED JUNE 13, 1905.
L. PEROTTI.
WEIGHING AND AUTOMATIC CRADLE.
APPLICATION FILED AUG. 3, 1903.

8 SHEETS—SHEET 1.

WITNESSES:
Ralph Lancaster.
M. V. Doyle.

INVENTOR:
Louis Perotti,
BY
Charles H. Pell
ATTORNEY.

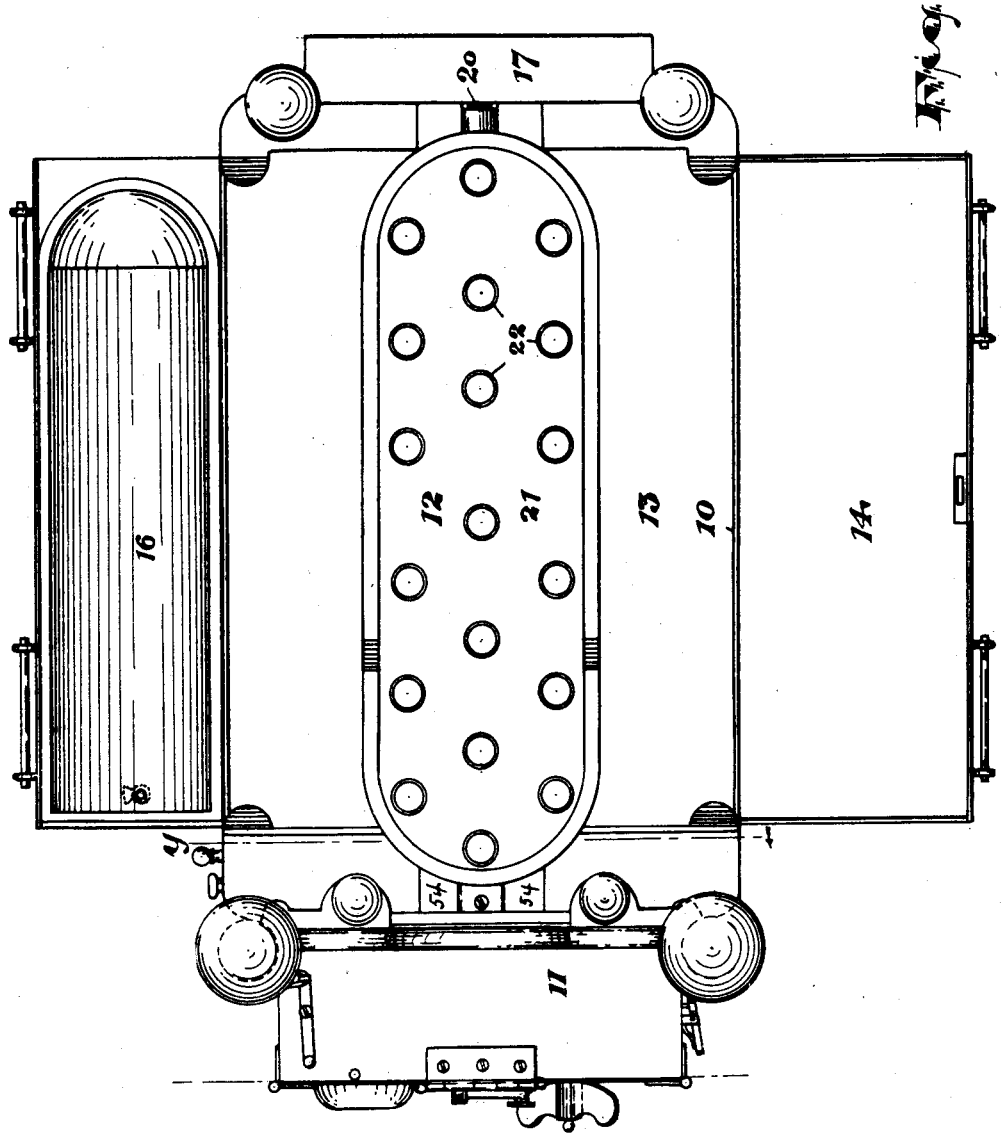

No. 792,447. PATENTED JUNE 13, 1905.
L. PEROTTI.
WEIGHING AND AUTOMATIC CRADLE.
APPLICATION FILED AUG. 3, 1903.
8 SHEETS—SHEET 3.
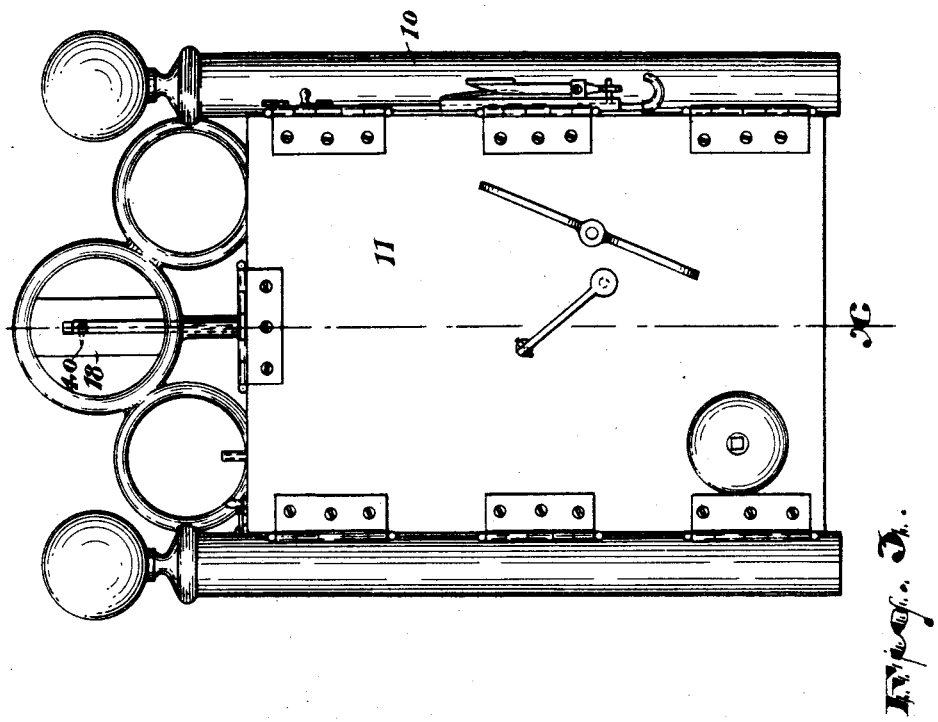
WITNESSES: INVENTOR
Louis Perotti,
BY
ATTORNEY.

No. 792,447. PATENTED JUNE 13, 1905.
L. PEROTTI.
WEIGHING AND AUTOMATIC CRADLE.
APPLICATION FILED AUG. 3, 1903.

8 SHEETS—SHEET 4.

WITNESSES:
Ralph Lancaster.
M. V. Doyle.

INVENTOR:
Louis Perotti,
BY
Charles H. Pell
ATTORNEY.

No. 792,447. PATENTED JUNE 13, 1905.
L. PEROTTI.
WEIGHING AND AUTOMATIC CRADLE.
APPLICATION FILED AUG. 3, 1903.

8 SHEETS—SHEET 6.

No. 792,447. PATENTED JUNE 13, 1905.
L. PEROTTI.
WEIGHING AND AUTOMATIC CRADLE.
APPLICATION FILED AUG. 3, 1903.
8 SHEETS—SHEET 7.
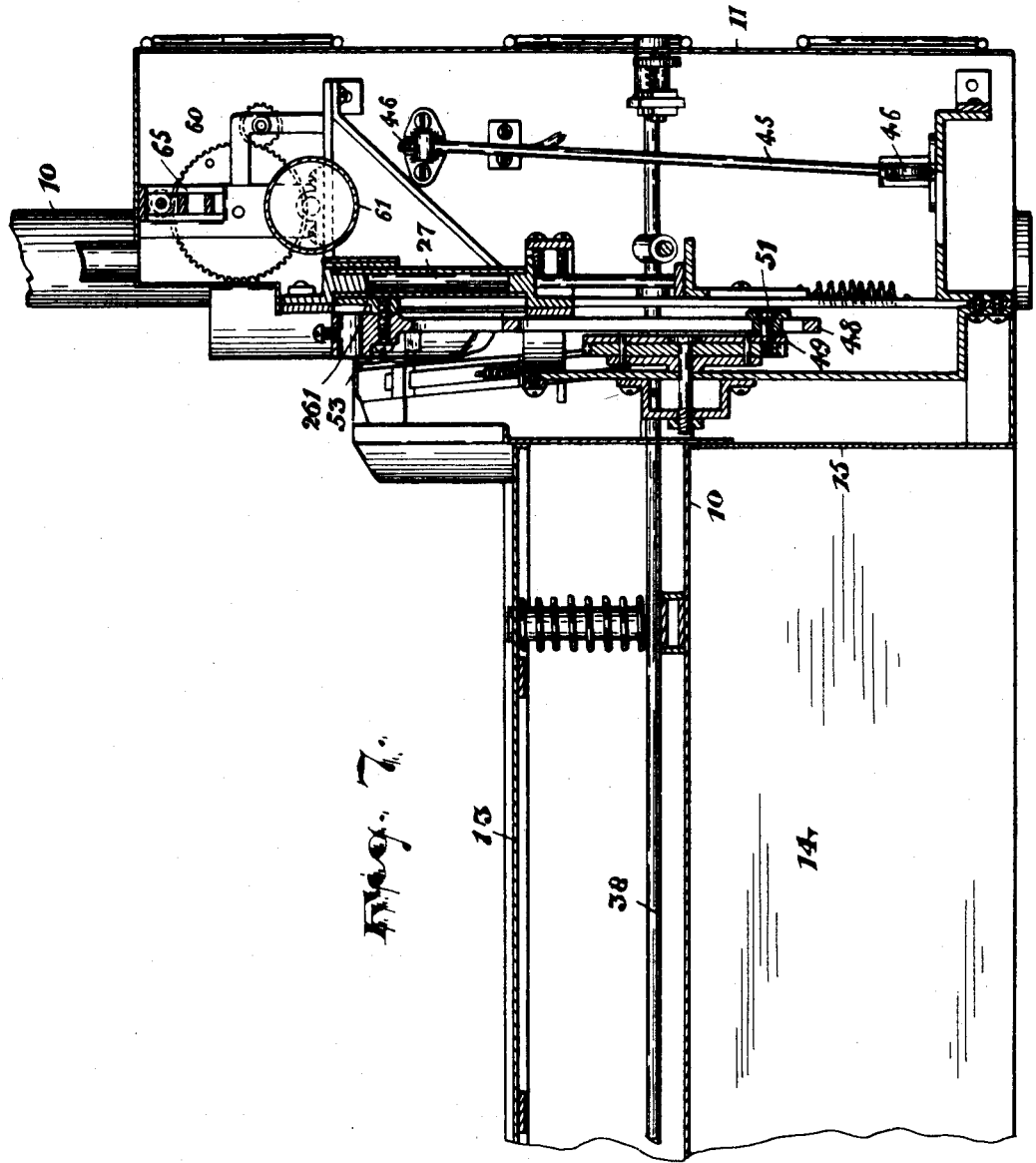
WITNESSES:
Ralph Lancaster
M. V. Doyle
INVENTOR
Louis Perotti,
BY
Charles H. Pell
ATTORNEY.

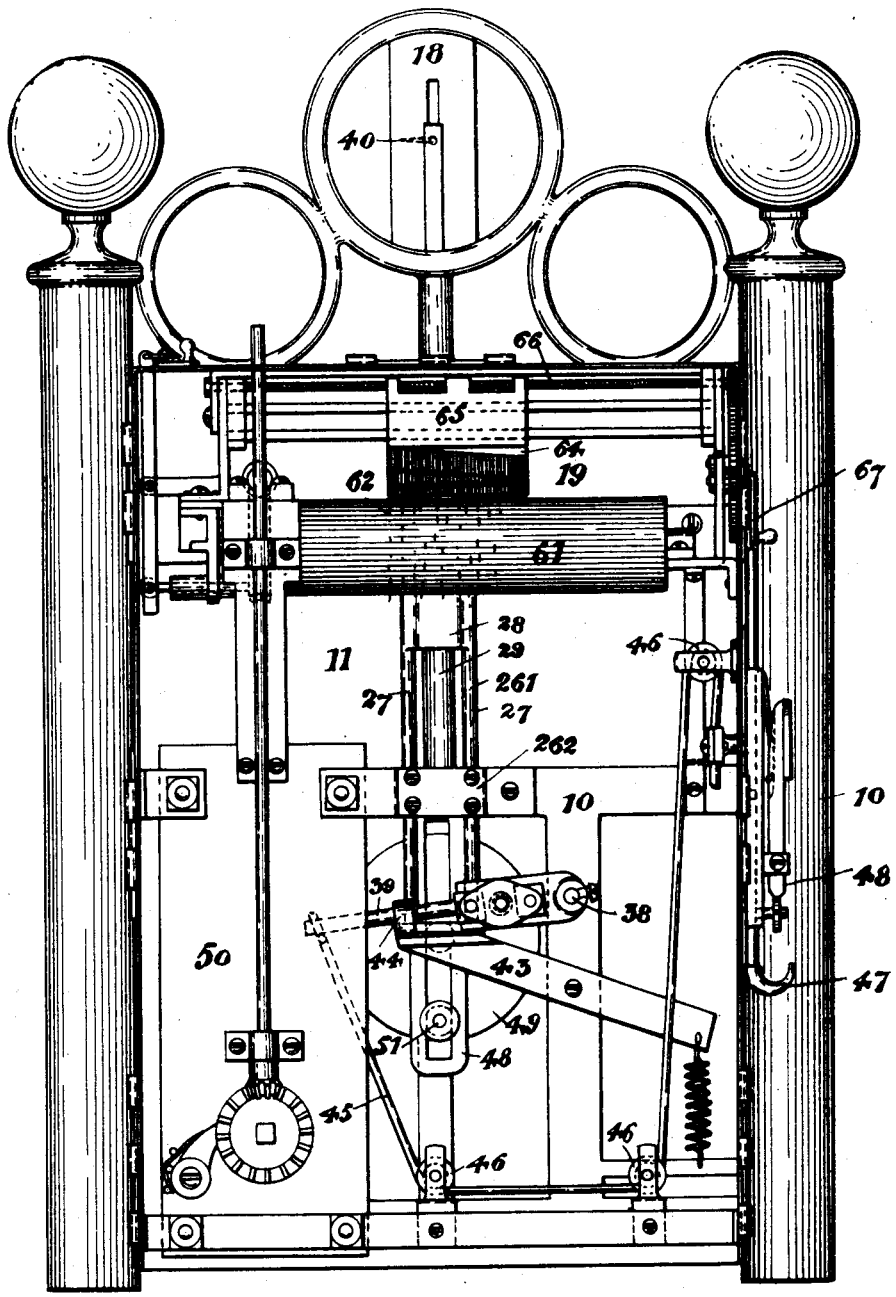

No. 792,447.

Patented June 13, 1905.

UNITED STATES PATENT OFFICE.

LOUIS PEROTTI, OF NEWARK, NEW JERSEY.

WEIGHING AND AUTOMATIC CRADLE.

SPECIFICATION forming part of Letters Patent No. 792,447, dated June 13, 1905.

Application filed August 3, 1903. Serial No. 168,010.

*To all whom it may concern:*

Be it known that I, LOUIS PEROTTI, a subject of the King of Italy, residing at Newark, in the county of Essex and State of New Jersey, have invented and produced new and original Improvements in Weighing and Automatic Cradles; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

The objects of this invention are to provide a rocking cradle for infant children which will when operated produce musical compositions, and thus enable the child to listen to the music while being automatically rocked, whereby its attention will be attracted, and thus lulled to sleep; to provide in one piece of household furniture a device adapted to rock the infant, enable him or her to be weighed from time to time, as may be desired, so that the increase of weight may be determined with greater convenience and regularity and the growth of the infant observed, and one in which the child can be conveniently bathed and in which its clothing can be stored away, and to secure other advantages and results, some of which may be referred to hereinafter in connection with the description of the working parts.

The invention consists in the improved rocking cradle for infant children, in the appliances thereof, and in the arrangements and combinations of parts of the same, all substantially as will be hereinafter set forth, and finally embraced in the clauses of the claim.

Figure 4:
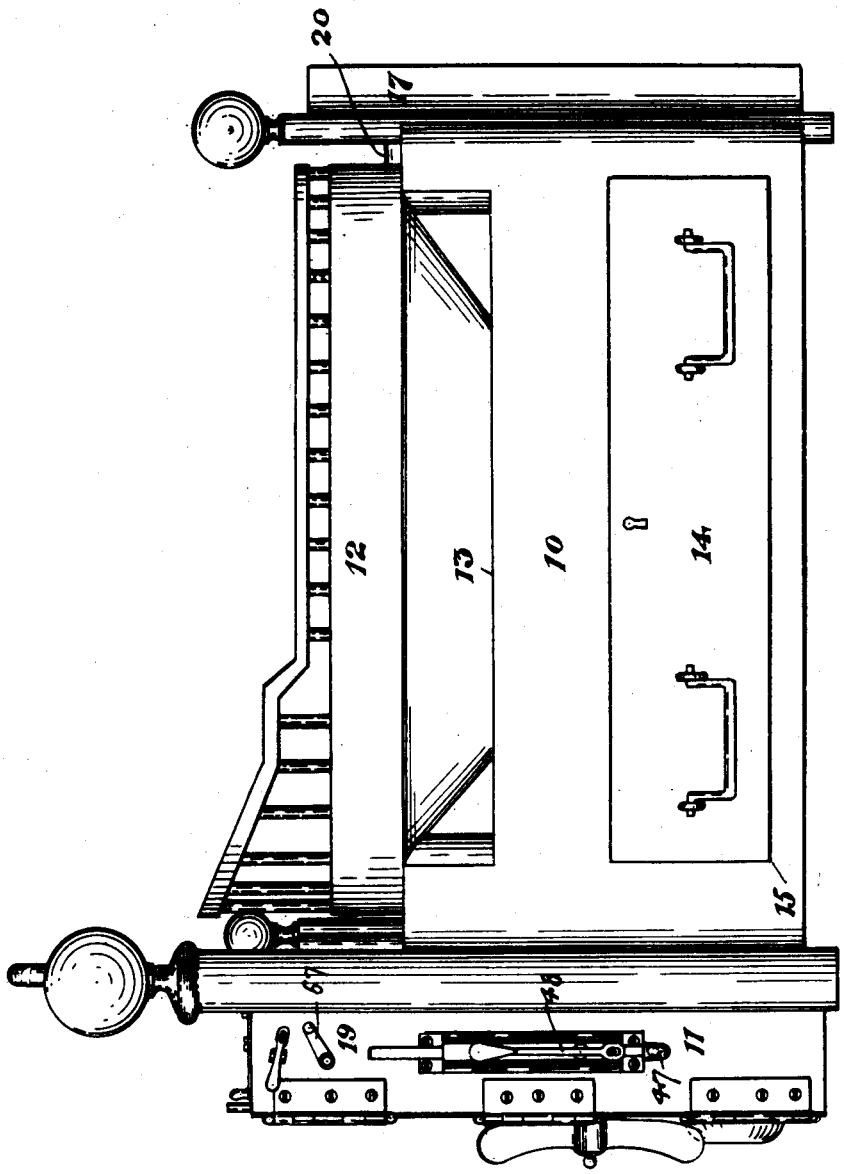
Figure 4:
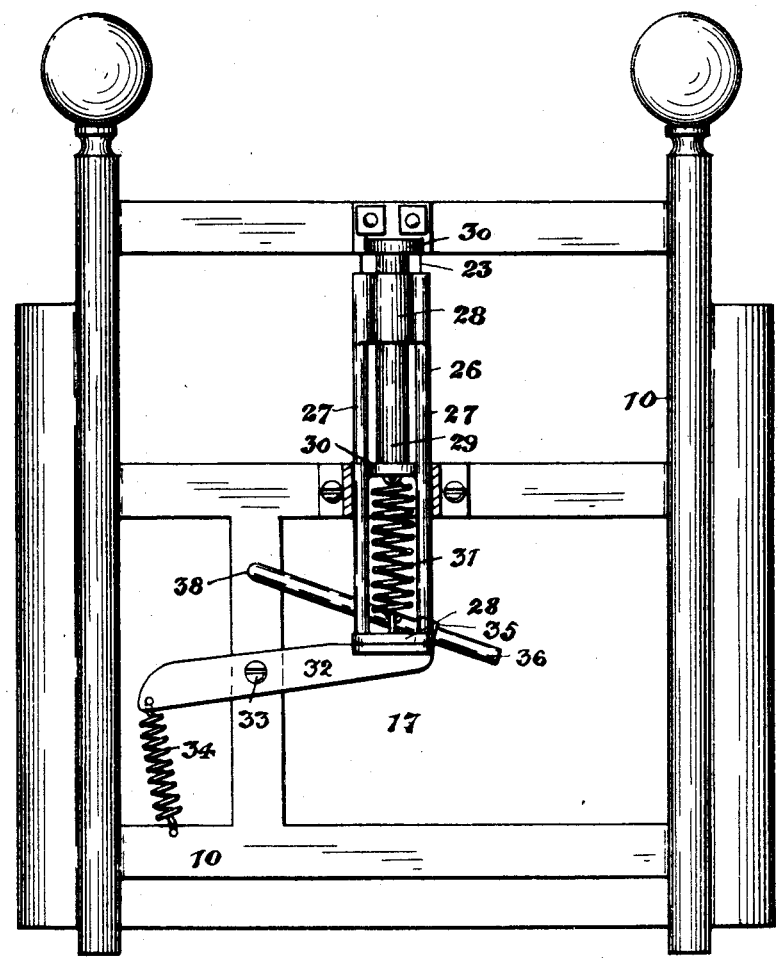
Figure 5:
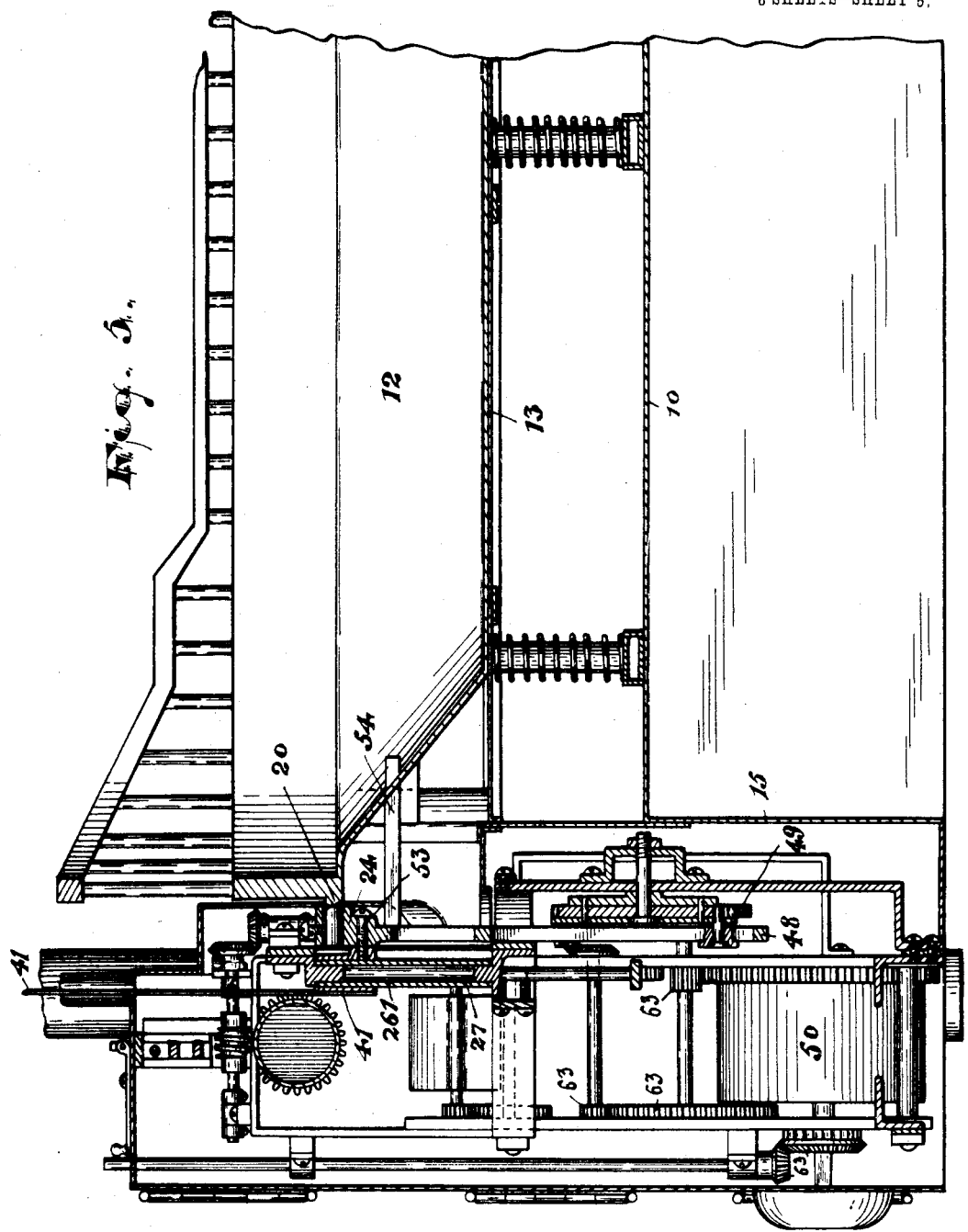
Figure 6:
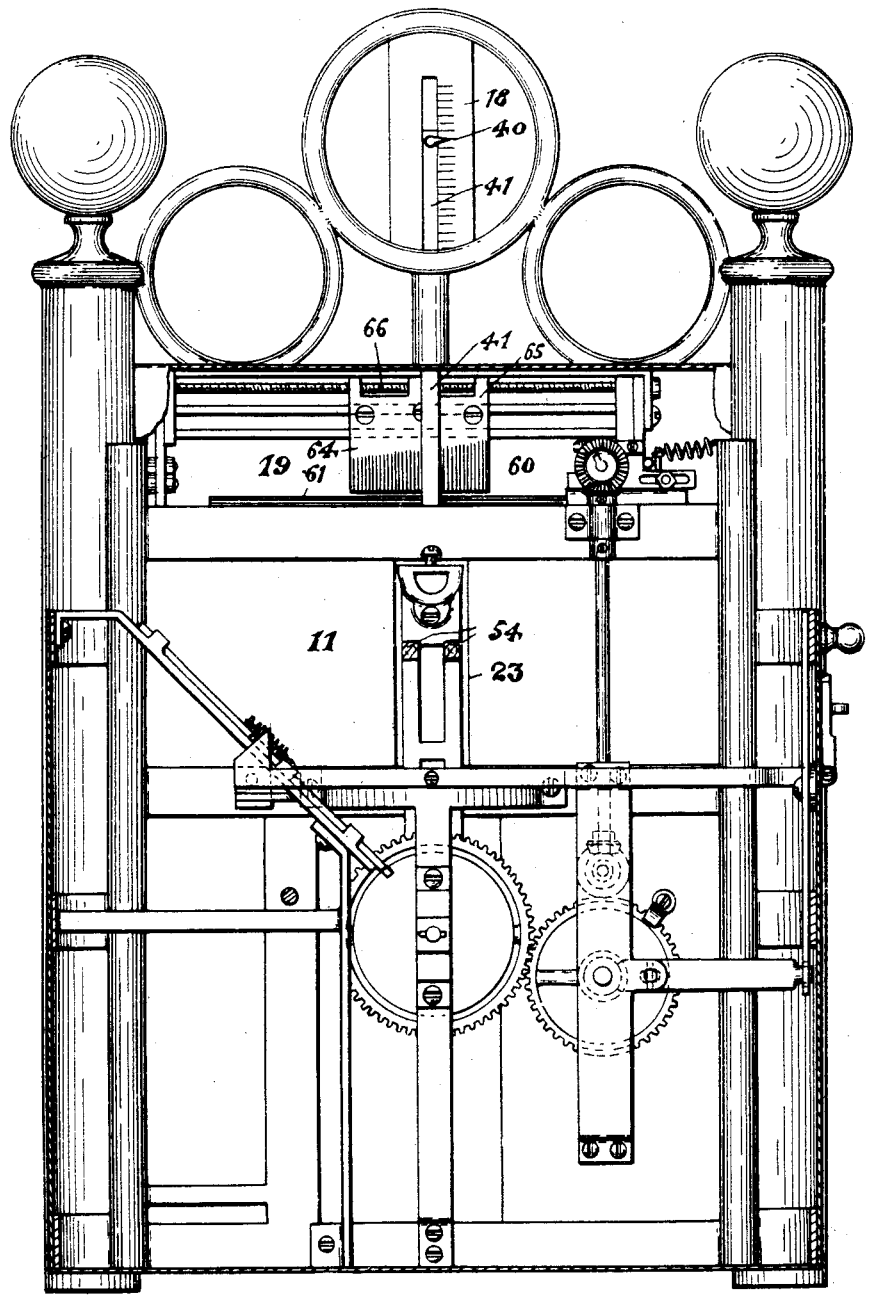

Referring to the accompanying drawings, in which like numerals of reference indicate corresponding parts in each of the several figures, Figure 1 is a side elevation of my improved cradle. Fig. 2 is a plan thereof, a certain storage-drawer and a bathing-tub being shown drawn out for service. Fig. 3 is an elevation of the head of the cradle. Fig. 4 is an elevation of the foot of said cradle, a certain rear plate or cover being removed to show the interior working parts. Fig. 5 is a longitudinal vertical section, on an enlarged scale, of the head portion of the cradle, taken on line *x* of Fig. 3. Fig. 6 is a transverse section taken on line *y* of Fig. 2. Fig. 7 is a central vertical longitudinal section taken on line *x* of Fig. 3 and looking in the direction opposite from what is presented in Fig. 5; and Fig. 8 is an elevation of the head of the cradle, the outer plate or cover being removed to show the construction of the working parts within more clearly.

In said drawings, 10 indicates the bed-frame of the device, which is preferably of metal or other material to suit various conditions and may be of any construction suited to the purposes desired. The said bed-frame is provided at its head with a vertical head casing or receptacle 11, Figs. 1, 2, 3, and 5, for a music-box and a motor or motors for rocking the cradle 12 and operating the said music-box, said motors being preferably clockwork-controlled by a spring or springs, a weight, or other suitable motive means. The said framework or bed 10 provides beneath the cradle 12 a horizontal table 13, beneath which is a chamber which will serve as a receptacle for a drawer 14 for clothing, toilet implements, &c., for use when washing the infant. Beneath the said horizontal table the said frame also provides a slideway 15, Fig. 1, for a drawer-like bath-tub 16, made wholly or in part of metal and of a size sufficiently large to receive the infant and enable it to be washed with convenience and ease. The one slideway may serve to receive the drawer at one end and bath-tub at the opposite end, the said bath-tub extending about half-way through the frame transversely. At the foot of the frame another receptacle 17 is provided for bearings and devices upon which the cradle may be supported and operated, as hereinafter more fully described. Within the head-receptacle 11 is also provided weighing means, by which the weight of the child is indicated on a dial or scale plate 18 at or near the top of the head board or portion of the frame. The said weighing means may be of any suitable construction; but the one preferred I will describe more fully hereinafter. The music-producing apparatus also may be of any suitable construction; but the one preferred I have made the subject of an independent application contemporaneous herewith. I will, however, describe my preferred music-producing means with sufficient fullness to enable a person skilled in the art of making music-boxes to apply one, and operate it in connection with a cradle, to the same motor, whereby the cradle 12 is rocked or oscillated and the music-box 19 operated simultaneous and together.

The cradle 12 is provided at its opposite ends with longitudinally-projecting pintles or pivots 20, by means of which the same is supported on its bearings at the head and foot boards of the frame, and within the cradle is a plate 21, having a series of collections of springs 22, upon which a mattress or other bedding may be suitably supported. The headboard of the frame and also the footboard thereof may be slotted vertically, as at 23, and through the slots in said headboard and footboard the arms 20 of the cradle extend into contact with the sliding bearings 26 261, the said sliding bearings being in connection with a weighing apparatus, as hereinafter described. The construction of the sliding bearings of the footboard is shown in Fig. 4, where the said bearings are shown to consist of a frame-like piece comprising two vertical bars 27, connected by cross-pieces 28, one of which is vertically apertured to receive the vertical shaft 29, fixed to the foot portion of the frame 10, upon which shaft the sliding bearings 26 slide vertically in the weighing operation. The said vertical shaft 29, providing a slideway for the said vertical slide, is supported on the brackets 30 of the headboard, and the said slide 26 at its lower end is fastened to the lower end of a helical spring 31, fastened upon said bracket 30. An increase of weight in the cradle tends to force the same downward against the resistance of the spring, as in any ordinary weighing-scales employing springs.

When the device is not to be employed as a weighing apparatus, the sliding frame 26 is supported in its upper position upon a resilient arm or lever 32, fulcrumed upon the footboard at 33 and held in place by a spring 34. The said lever 32 is provided with an eye 35, through which an arm 36 of a rod 38, extending lengthwise of the device and having a similar arm 39 at the head of said device, extends, so that when the sliding frame 26 lowers under the weight of the child the said arm 27 and rod 38 will be turned, as also the arm 39 at the head of the cradle, and thus the movements due to applied weight of the child, whether applied at the head or foot of the cradle, will be regulated and properly expressed by the index-finger 40 of the dial-plate, as hereinafter described.

The weighing connections as employed at the head of the cradle are shown in Figs. 5, 6, 7, and 8, where the sliding bearing or support 26 is shown within a bracket 262 of the frame and is constructed substantially the same as that at the foot of the device. At its upper end said frame is provided with a rod 41, which extends upward from the said sliding bearing or support to the slotted plate having graduation-marks thereon adapted to indicate the different degrees of weight, the said rod 41 being provided with the index-finger or pointer 40 to facilitate the observations, as already described. The arm 39 extends through an eye 44 on the lever 43, similar to and corresponding with the lever 32 and eye 35, already described.

For rocking purposes when the device is not employed as a weighing apparatus the levers 32 43 are drawn away from the sliding bearings by a cord 45, suitably arranged over sheaves 46 and controlled by a suitable handpiece 47 and catch 48. By drawing down on said handpiece the supporting ends of the levers 43 32 are lowered from engagement with the sliding bearing, leaving the sliding bearing at the head portion of the frame 10 to be oscillated.

I have pivoted upon the upper end of the sliding support or bearing 261 an oscillating and slotted arm 48, which extends downward to a crank-wheel 49, arranged in connection with a motor 50 within the headboard, the power being communicated from the said motor to the said crank-wheel by means of suitable intermediate gearing of any desired construction. Said motor is preferably a spring-motor. The crank-wheel 49 has a crank-pin 51 sliding in the said slotted arm 48, so that as said crank-wheel rotates the said arm is caused to oscillate, and the arm 20 within the semicircular socket in the upper end of said oscillating arm is caused to oscillate, and thus impart the same movement to the cradle. The slotted arm 48 during the weighing operation is brought into vertical position, and thus may move longitudinally downward and not interfere with the weighing operations.

The supporting-arm 20, extending horizontally from the foot of the cradle to its bearing in the sliding frame 26, is a pivot adapted to turn within the bearing box or socket of said frame 26. At the head of the cradle the arm 20 is made semicircular to enter the socket of the oscillating arm 48, the last said socket being horizontally in line or nearly in line with the pivot 53, connecting said oscillating arm to the sliding bearing 261. Thus the oscillating movement of the arm 48 imparts to the cradle little if any other than a pivotal movement to the cradle.

To relieve the arm 20, attached to the oscillating arm 48, of some of the strain which would otherwise be applied thereto, I prefer to attach to said oscillating arm 42 other arms 54, eccentric to and distant from said arm 20, which engages the cradle to help in swaying the same.

The spring-motor is provided with any of the ordinary devices for transmitting power, governing the speed, winding the spring, &c., and I do not wish to be limited to the detail constructions shown, as it will be obvious that many and various changes may be made without departing from the spirit of my invention.

I am aware that various other weighing devices may be employed, and I will show another form of weighing apparatus in a contemporaneous application.

I have connected with the motor 50 a mechanically-operable music-box 60 of any suitable variety. I have shown one variety in the drawings herewith, which will form the subject of a special application for a patent. Any other variety having means for producing musical compositions automatically may be employed, whereby when the cradle is being oscillated or rocked the tunes may be produced by power derived from the cradle-rocking motor. In the drawings, 61 is a cylinder having pins 62, the said cylinder being in train by means of gear-wheels 63, intermeshing one with another with the said motor 50. 64 indicates a comb having a series of musical tongues adapted to be tripped by the pins of the cylinder to secure the desired sound-producing vibrations, the said comb being carried on the sliding carrier 65, arranged at the top of the headboard and adapted to cause the comb-teeth and pins to trip at predetermined times to effect the desired tune or music. The details of the preferred construction of the music-box will be more fully explained in a contemporaneous application above referred to. The sliding carrier 65 is operated by means of a screw-shaft 66 to change the tune from time to time, the said screw-shaft being turned by means of a hand-crank 67 and a train of gearing connected therewith in any suitable manner.

Having thus described the invention, what I claim as new is—

1. The improved cradle herein described, comprising a frame having at its head a vertical head casing or receptacle for a music-box and motor and having bearings for a cradle, said frame having a horizontal table beneath which is a chamber having drawers therein, and having at the rear, rear bearings for said cradle, a music-box in said head-casing and a motor for operating said music-box and oscillating said cradle, connections of said motor communicating with said cradle and music-box, and said cradle arranged above said drawers and in said bearings and adapted to oscillate under the power imparted by the motor.

2. In a weighing apparatus, the combination with a vertical slideway-shaft arranged upon a supporting bed-frame and having a spring 31, suspended therefrom, of a sliding frame having bars and cross-pieces one of the latter being vertically apertured to receive said vertical shaft, the lower end of said frame being attached to the lower end of said spring, said frame being in connection with an index-finger and a graduated plate and means to receive a weight, substantially as set forth.

3. In a weighing-cradle, the combination with vertically-sliding bearings suspended from springs, of an oscillating cradle arranged on said bearings, a graduated plate and index-finger connected with said sliding bearings, and means for oscillating the cradle, substantially as set forth.

4. In a weighing-cradle, the combination with bearings suspended from springs, of an oscillating cradle arranged on said bearings, a graduated plate and index-finger connected with said sliding bearings, and means for oscillating the cradle, substantially as set forth.

5. The combination with spring-supported bearings and weight-indicating connections, of an oscillating cradle supported in said bearings, means for oscillating said cradle and means for relieving the weighing-springs from weight when oscillating the cradle, substantially as set forth.

6. The combination with sliding bearings, a bed-frame and springs and connections connecting said bearings to said bed-frame, a slotted arm pivoted on one of the said bearings and connected to the cradle, a crank for oscillating said slotted arm, a motor for operating the crank and a cradle supported by said sliding bearings, substantially as set forth.

In testimony that I claim the foregoing I have hereunto set my hand this 21st day of July, 1903.

LOUIS PEROTTI.

Witnesses:
CHARLES H. PELL,
JOSEPH PEROTTI.